Figure 12:
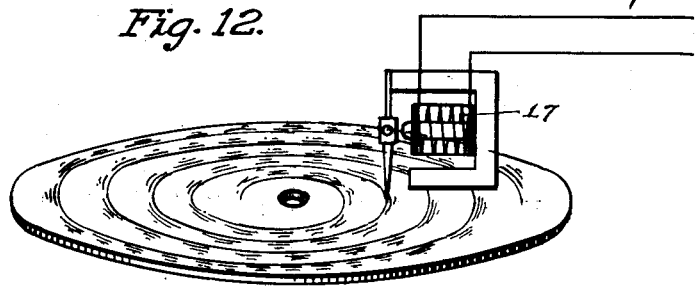

April 10, 1928.  E. THOMSON  1,665,331
PRODUCING AND REPRODUCING SOUND RECORDS
Filed Oct. 29, 1924  3 Sheets-Sheet 1
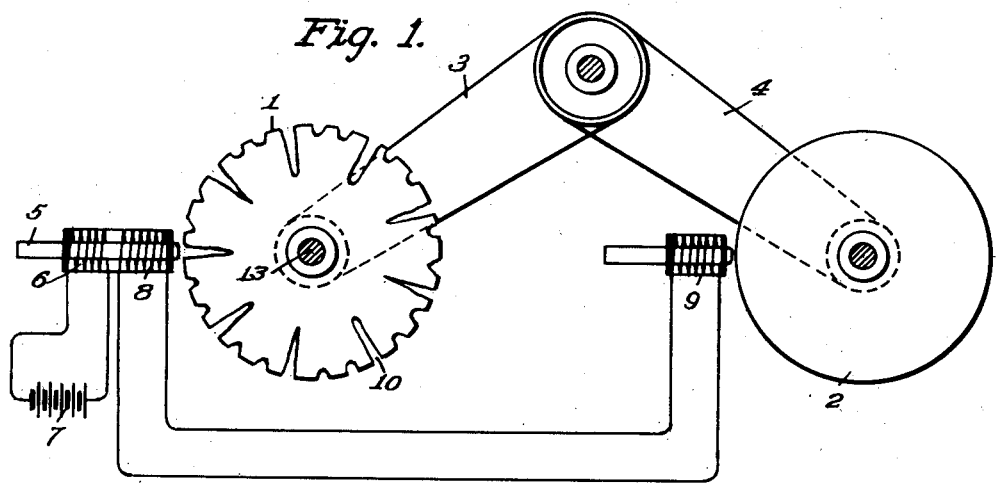
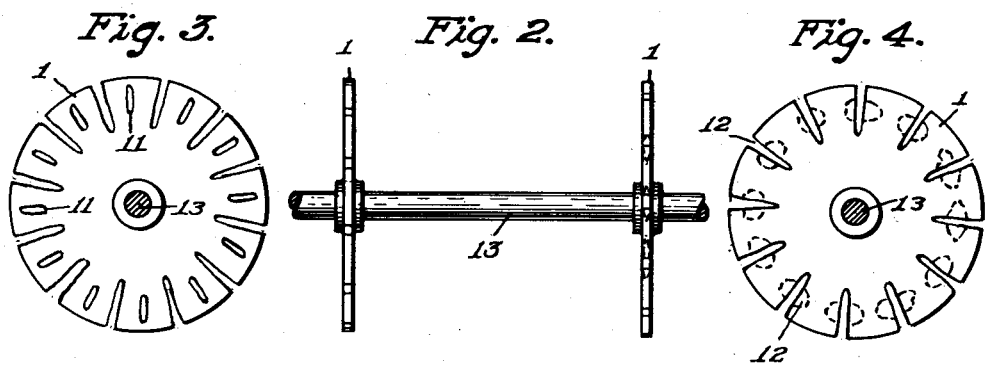
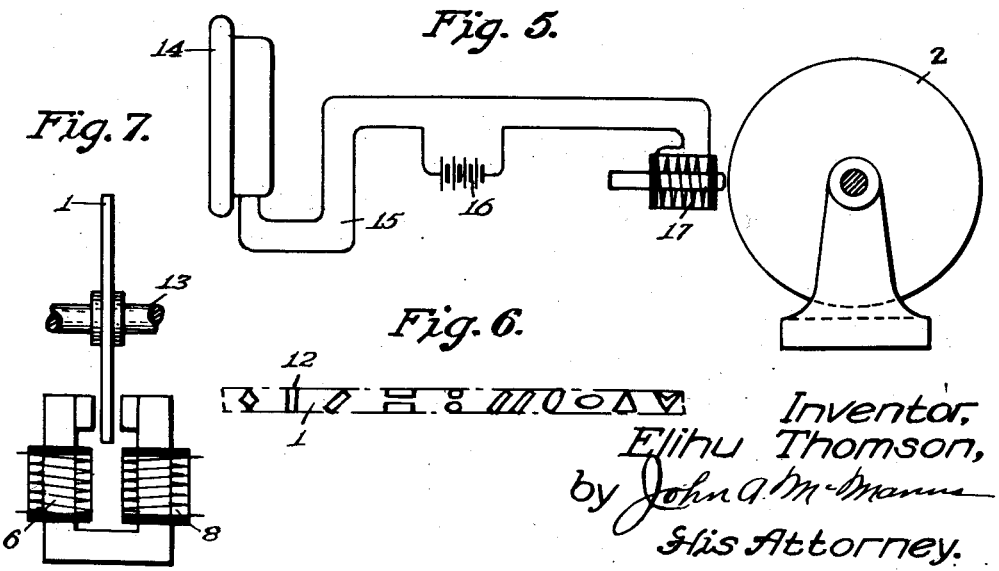
Inventor,
Elihu Thomson,
by John G. McManus
His Attorney.

April 10, 1928.
E. THOMSON
1,665,331
PRODUCING AND REPRODUCING SOUND RECORDS
Filed Oct. 29, 1924     3 Sheets-Sheet 2
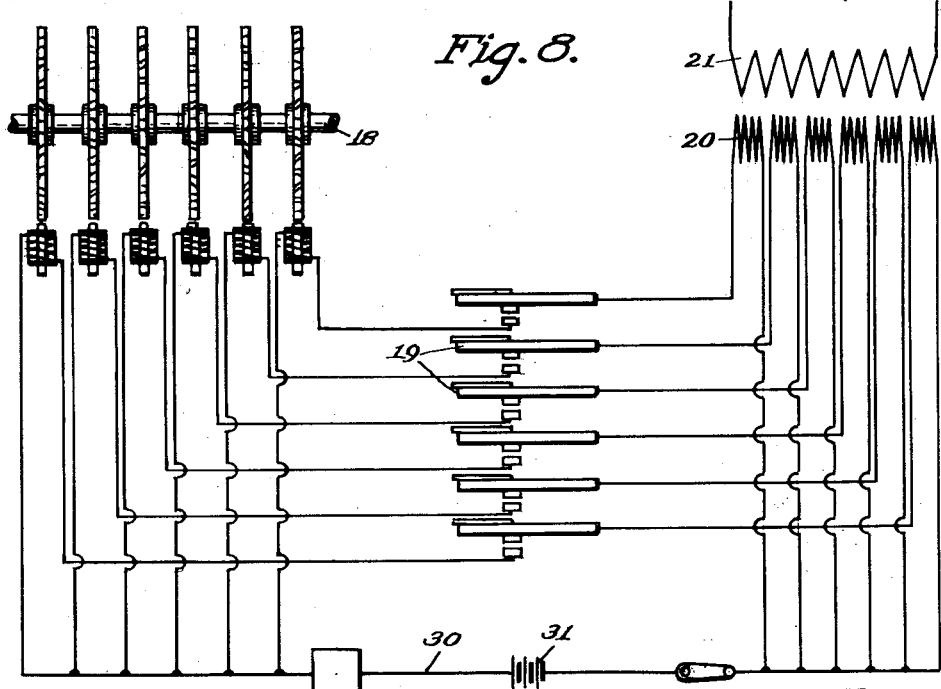
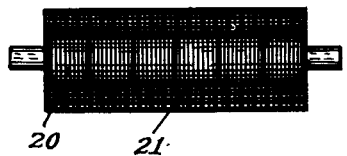
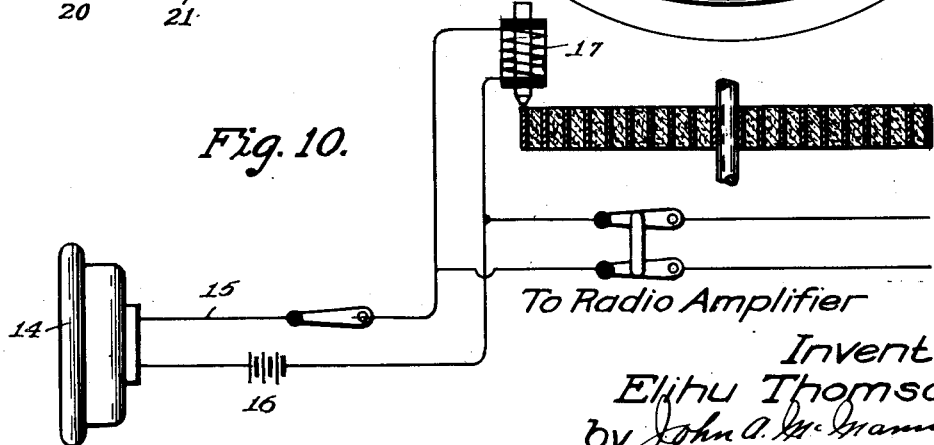
Inventor,
Elihu Thomson,
by John A. McManus
His Attorney.

April 10, 1928.

E. THOMSON 1,665,331

PRODUCING AND REPRODUCING SOUND RECORDS

Filed Oct. 29, 1924     3 Sheets-Sheet 3

Inventor,
Elihu Thomson,
by John Q. McManus
His Attorney.

Patented Apr. 10, 1928.

1,665,331

UNITED STATES PATENT OFFICE.

ELIHU THOMSON, OF SWAMPSCOTT, MASSACHUSETTS, ASSIGNOR OF ONE-HALF TO JOHN A. McMANUS, OF LYNN, MASSACHUSETTS.

PRODUCING AND REPRODUCING SOUND RECORDS.

Application filed October 29, 1924. Serial No. 746,606.

I have invented certain new and useful improvements in producing sound records and in reproducing from them sound waves whereby it is possible to originate sound or combinations of sounds mechanically, or to obtain any pitch of tone or musical record from an originator, as I term it, and preserve its characteristics or its timbre. In this way a whole musical scale can be originated if desired.

The main object of the invention is so to control the impulses of electric currents in their generation as to give them specific qualities; that is, to reproduce in them definite arrangements of overtones representing special timbre of sound, and to do this by impressing upon an electric circuit vibrations obtained by revolving disks in front of magnets and inducing in coils in inductive relation to the latter electric currents and combining in themselves any particular rates of vibrations desired, together with such other rates of vibration constituting overtones as may be effective for representing or originating a tone or reproducing a tone. One of the ways of doing this is to use a properly shaped or indented originator disk which may be of iron or conducting material revolved in a suitable magnetic field, whereby the shape of the disk, by slitting, perforation, notching or insertion of other pieces or segments by or deformation, may be used to modify the field periodically. The originator disk is made to originate the fluctuations of current which are then recorded upon magnetic disks used in the manner of the telegraphone.

Another object of the invention is to use a set of magnetic disks which have been prepared from the originating disk, such set being related to each other on an axis, or revolved at such speed that a musical scale can be obtained. The assemblage of such disks on a shaft, for example, revolving at a given rate, may be used to produce all the notes required in a musical scale by their magnetic action on an electromagnetic receiving system, in which currents are generated and operate on a reproducer diaphragm or the like, responsive to the action of one one or more of the recorder disks thrown on or manually operated by keys or by automatic means, such as perforated paper rolls. In my invention, the generated currents in the latter case are combined through a suitable transformer or set of transformers, in which their primaries are connected with the magnetic coils responsive to the several disks and the secondary circuit of the coil which controls the diaphragm, producing the music, and this is done either directly when sufficiently powerful, or better, through amplifying means to amplify or intensify the volume of sound to any desired degree. In this latter case where amplifying means are used, the generated impulses so amplified may be extremely feeble, as in radio work, and, in fact, the same amplifying means as used in a radio receiving system may be used in this case, and the idea is to actually make use of the amplifying means of the radio so as to intensify the electrical effects obtained in the operation of my invention. In brief, it may be said that in my invention there is involved the production by novel methods of musical impulses of electric current, and these are suitably recorded in the form of a magnetic field on disks or recorders in definite relation to each other as a musical scale, and from this system music may be produced by a key-board or by other means operating a circuit from which the final reproduction takes place. While the disks which have been mentioned as operating telegraphone records, may all be on the same shaft revolved at a definite speed, this is by no means essential, as separate shafts running at separate definite speeds in relation to each other can be made to carry, each one, a limited number of disks, while the total may represent all the notes of the scale. Furthermore, one set of disks may carry, as it were, a note which might represent the note of the flute stop, so to speak. Another set of disks might have recorded notes of the violin, etc. whereby these different qualities may be combined in the recorder through simple primaries and acting on single secondaries giving in their secondaries the combination in effects produced by two or more of the primary currents, the secondaries being connected as before with the reproducing mechanism as in ordinary tone production from vibrating diaphragms. There may also be in this system sets of disks which themselves combine the tones of one or more instruments in a musical scale, while at the same time it is contemplated in my invention to originate or produce musical tones which are not in accordance with any single instrument, or which, in fact, although harmonious may not have any relation whatever to the tones of any instrument existing. In the combination by the transformers with multiple primaries or single secondaries, or the equivalent thereof, there may be a second transformation in which the currents from several secondaries are combined in a number of second stage primaries, so that in the end there is simply a secondary circuit in which every variety of sound that is being produced exists as a compound wave current result to be intensified or amplified for reproducing sound in a horn or horns, as is common practice with radio reproducers. In this system of generation, amplification or loudness of the tone produced may be varied in several ways, as by changing the distance of the reproducing magnet arrangements from the disks which act upon them, or by introducing resistance into the reproducing circuit at any proper points or by other suitable means.

Figure 13:
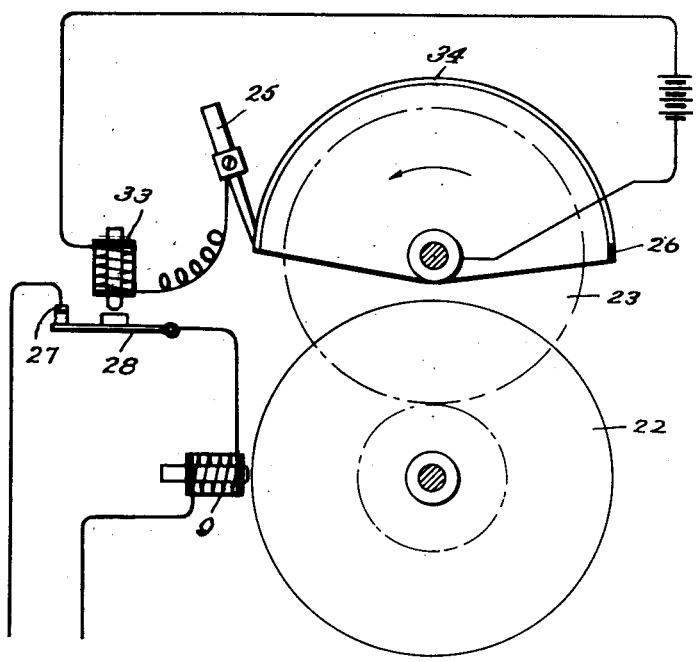
Figure 14:
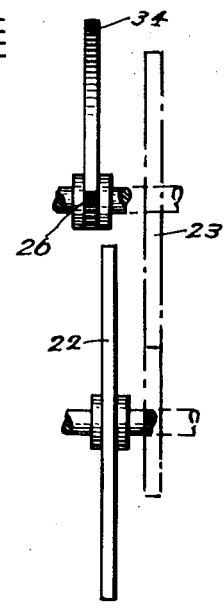

Reference may be had to the drawings which accompany this specification for rendering clear the nature of the invention itself. Fig. 1 shows diagrammatically one of the methods for generating and recording the musical tone, in which the principles involving the invention are employed; Fig. 2 shows a shaft having two such reproducing disks mounted thereon; Fig. 3 shows a modification of notching of the originator disk different from Fig. 1; Fig. 4 the same; Fig. 5 shows the method of impressing the recording disk as in the telegraphone, and also reproducing from such disk or disks used in the various forms of my invention, a suitable tone by the operation of the diaphragm; Fig. 6 is a diagram of the various forms of magnetic pole ends or abutments which may be used in conjunction with the originator disks when they are of magnetic material, as in Fig. 1. These various pole ends may be given shapes which have a varying action in modifying the forms of the electric waves subsequently recorded and reproduced as sound waves. Fig. 7 shows a modification of the method in which, instead of magnetic disks, there are conducting disks having a variety of forms to be described later; Fig. 8 is a diagrammatic view of a number of disks revolved synchronously on a single shaft, cooperating with a number of electromagnetic circuits connected thereto for reproducing tones, either singly or in combination, as will be described; Fig. 9 shows the induction coil or transformer in which there may be a number of secondaries, and a much larger number of primaries for inducing current in the secondaries; Figs. 10 and 11 indicate recording of a sound on a reproducing steel tape where a record of some length is to be had; Fig. 12 shows the manner of reproduction from an ordinary phonograph record of electric impulses, which, though feeble, can be used when amplified, to produce loud sounds when they are led to the radio amplifier; Figs. 13 and 14 show methods of securing records from a sound wave and preventing the overlapping of the records or preventing the continuance of the recording operation for more than a single revolution, as recorded on the disk.

In Fig. 1, 1 represents a steel or iron disk or wheel shod with magnetic material (as a tire or surrounding portion). Its periphery is notched in such a way as to produce waves of magnetism rising and falling in the core 5 of a magnet mounted close to the edge of the disk. The actual core presented to the disk may have different end forms, as in Fig. 6. This core 5 may be a permanent magnet or may be energized by a coil 6 and battery 7, while the coil 8 surrounding the same core receives the impulses which are set up by the revolutions of the magnet disk with the notches 10, etc. These electric impulses so induced are carried to another coil 9 surrounding a magnetizable core of similar character presented to the edge of a smooth steel disk 2. Driving mechanisms 3 and 4 are provided for maintaining the disks 1 and 2 in definite rotative relation, such as the same speed, or in other cases at a ratio of 1:2, 1:3, 1:4 or reversing, 1/2, 1/3, 1/4, or any desired definite relation found useful in the operation of the apparatus. Where the speed is to be identical, the disks may be on a single shaft, as in Fig. 2, but where this is not the case, they are very smoothly geared so as to run with definite rates with respect to each other.

A number of deeper grooves are formed in the iron disks 1, as at 10, and their shape determines the character of the wave form of the current acting on the record disk. Obviously as these deeper pits or slots are fewer in number than the indentations or grooves throughout the periphery of the disk, the waves of magnetism and current developed are a submultiple of the note which will be developed by the waves produced by the shallower grooves; that is to say, the pitch of the deeper grooves will be a sub or invert harmonic of the fundamental developed by the shallow grooves. The character of the deeper grooves forms a very important feature of my invention. By carefully modifying their depth and contour, that is to say, their shape, the character of the harmonics is determined, and it is the harmonics rather than the fundamental tone which gives beauty to a tone; it is the important factor which determines quality or timbre in music.

Now if such a disk as in Fig. 1 is revolved at any speed desired, the disk Fig. 2 will, as a recorder, be impressed with waves of magnetism corresponding to the shape of the disk 1, and this will be the case irrespective of the speed of the two disks, provided the speeds are alike. Where they are not alike, but bear a definite relation to each other, the same record on the disk 2 is produced with the same elements of overtone as in the case mentioned, but more or less vibrations will be recorded on the receiving disk 2 in accordance with the relation of speed between the two disks which always should work out in whole numbers of vibrations. In this way from a single master originator disk 1 a number of disks 2 can be generated on the edges of which are impressed magnetically reproductions of tones of desired quality, and, in accordance with the speed relations, also of the desired pitch (when disk 2 is running at some definite rotative speed, subsequently). Figs. 3 and 4 are merely suggestive of the changes in the notching of the disk (which may be of the greatest variety) each disk producing its own characteristic record tone. The record disk 2 or a set or a series of them may be provided with a reproducing arrangement shown diagrammatically in Fig. 5, and each disk as mounted on a shaft and revolved may be made to combine its action when the circuit of its reproducing electromagnet is closed so as to produce compound tones, chords, musical sequences, etc.

Instead of having the originator disk in Fig. 1 of magnetizable material, it may be of conducting material and revolved as a damper disk between the poles of a magnet and induce in the coils of the magnet electric vibrations in accordance with the structure of the disk, which itself may be provided with notches or windows or inserts, or may be given outlines such as to produce an electrical wave form, as it were, of definite pitch relations constituting definite compound waves. This is an alternative method of construction or production of the tones which are recorded on such disks as 2, Fig. 1.

Where a number of disks representing, say, the notes of a musical scale are combined on a single shaft, as in shaft 18, Fig. 8, where six such disks only are shown where there might be a complete musical scale of several octaves, or as many as four or five octaves of twelve notes each, they may be used in conjunction with the set of electromagnets presented to the peripheries, and each of these magnets may be in the circuit through its own key 19, and through its own primary of the transformer of each coil 21, which has a single secondary. The circuits may have a common return 30 uniting one terminal from each of the magnets and one terminal from each of the primaries, and in this return may be made if desired a battery 31 and variable resistance 32 for controlling the power of the impulses or loudness of tones eventually produced. It will be seen in this system that if each of the disks on the shaft 18 has a record of sound upon it as recorded from the originator method Fig. 1, such disk corresponding to disk 2 of Fig. 1, then on the revolution no effect would be produced in the secondary 21 until a key is closed or a circuit through one or other of the magnets is closed by the key. If two or more keys are closed at the same moment, a combination of tones is produced, so that this arrangement may be compared to an electric organ with a keyboard producing a sequence of tones or combination of tones in chords or other relation. The ordinary keyboard, of course, would have many more times the number of keys and the whole apparatus would be much more extended. If instead of the key action indicated at 19 we use the ordinary methods of the perforated paper sheet carrying the musical composition which it is desired to play and have a number of notes represented, as in a musical instrument, then the closure of several circuits at once gives a tone resulting from the combination electric current in the secondary 21 which can be carried to a reproducer of sound. It is desirable to have this very needle, and the size of the apparatus therefor of a small scale, and at last to amplify it by audio-amplification means, as in radio receivers. Where the elements are in great number, as in a musical keyboard, it may not be easily possible to combine the required number of the primary coils in inductive relation to a single secondary, as shown in Fig. 8. In this case, however, it is easily possible to make a second step and take a number of secondary coils, such as in Fig. 1, connected to a second transformer, where these secondary coils feed a number of primaries and finally combine in a single secondary the whole of the complicated set of impulses. In such a case, a coil similar to 9 would be used where the primaries would be represented at 20 and the final single secondary 21.

In case it be desired to combine records such as those of a telegraphone made by the voice or a musical instrument, then the same apparatus may serve with the addition of a recording spiral (as in the ordinary telegraphone) the record being impressed upon the edges of a spiral sheet of steel and reproduced with amplification in the same way. This, while forming no essential feature of my invention, may be used as an addendum to it, or may be combined with it for increasing its range of utility. In the same way, a photograph record of the ordinary disk type instead of the ordinary diaphragm or needle reproducer may be provided with an electromagnetic reproducer, in which the needle vibrates a small piece of magnetic material, such as iron, in front of the pole of a small electromagnet or permanent magnet, as the case may be, thereby producing feeble electric current carried thence to the audio-amplifier, as the feeble currents from the other apparatus are carried. This again extends the utility of my apparatus, and also on account of the fact that the actual vibrational force of the needle as acting on the record is almost negligible, the wear on the record becomes negligible, and is, therefore, to be distinguished sharply from the ordinary means of reproduction wherein the whole volume of tone is reproduced without amplification, and is dependent upon the actual motion, with considerable force, of the reproducing needle. This results in the case of powerful musical pieces in the more or less early breakdown of the records. In the arrangement pointed out, however, the breaking down does not occur and the record lasts indefinitely, since the real power put into the tones comes from the audio-amplification itself, which may be controlled as before by the variable resistance in its circuit.

Where an apparatus such as Fig. 5 is used to impress upon a record disk by the electromagnet 17 a definite tone, as that of a violin or flute, or even of the voice, as received upon the part 14, which consists of a microphone, it is essential that such a record should not overrun one revolution, unless there is an absolute synchronic relation between the vibrations and the revolutions of the disk, a matter difficult to obtain. As it is contemplated to use the vocal or instrumental record in precisely the way that the originator is used, namely, that such a record is employed to produce others, but that the pitch of the others so produced shall depend on the relative speeds, and, therefore, be higher or lower so that a musical scale may be filled out, having its origin in a single musical tone of an instrument or voice, the problem is one of producing a record in a single revolution, no matter whether the sound itself endures longer or for a lengthened period beyond the time of a single revolution. The arrangement Figs. 13 and 14 is devised for this end. The record disk is shown marked 22. It is a steel disk which is to receive electromagnetically a record from the impressing magnet 9, as in telegraphone practice. This magnet 9 is connected with a microphone or other electric current producing apparatus corresponding to the tone of an instrument or to the voice tone. Geared to the shaft bearing this record disk 22 and in the ratio of 2:1, is a second shaft bearing an electric circuit closer which during the half revolution of its shaft closes the circuit. Bearing on an arc, which is a semi-circle, is a brush 25 for making contact and closing the battery circuit, which is completed through a contact making magnet 33, the armature attached to which closes the contact at 27, 28 throwing on the microphone circuit at the moment the contacting arc 34 during revolution in the direction of the arrow comes under the brush 25, the arc 34 being connected to one terminal of the battery 35, and whose other terminal is connected to the magnet coil 33 to the brush 25. On setting the apparatus in motion with the brush 25 lifted, nothing happens; no record is made on 22, but if during revolution the brush 25 is dropped into contact with the surface of arc 34 for a period of half a revolution or more, then a record will be made on the disk 22 during the whole revolution only, unless the brush 25 is allowed to run too long. It is contemplated, however, to lift it the moment after it has lost contact with the point of the semi-circular arc at 26. A little error in the lifting of the brush will be of no consequence, because there is a whole half revolution in which it can be accomplished. In this device, therefore, we have the means for recording during one revolution of the recording disk (and one revolution only) a record, so that the records or vibrations do not lap over into a second revolution. Such a disk is then used to produce, by varying its speed relation to other disks, or sets of disks, on these disks a record, the pitch of which may be widely different from that of the disk 22 itself, but in which the record has the same qualities of tone, be they of the violin or of the human voice, or the flute or other instrument, just as in the case of the originator disk 1, which characteristics, whatever they may be, will be reproduced on disks which run on a single shaft, and which may be given the widest variations in pitch between them, and when run at a constant speed may produce, if properly graded, notes of the musical scale as before described. It is, of course, desirable that the speed of the disk shall bear to the number of vibrations recorded in this case an even relation as far as may be; that is to say, the record during one revolution should in number of vibrations and space on the disk between them be commensurable with the circumference or periphery of the disk itself.

It will be clear from the preceding description of my invention that the instrument may be employed either as a mode of reproducing music or speech, and as the method and apparatus described records with great precision the minutest variation of the air-wave in a tone with faithful recording of the minute ripples due to the higher harmonics, the refined quality which gives characteristic distinction to the music of different types of instrument, clarionet, organ, flute, violin, horn, etc. (and in fact any kind of sound), is reproduced with great fidelity. Moreover, it may all be done on a very small instrument comparable in size to an ordinary phonograph, and results comparable with a large, expensive pipe-organ can be placed at the disposal of a person of limited financial resources; this follows from the plan I use of making record disks of thin material which may be made by punching with extreme accuracy at little expense.

It will be understood that wherever electric circuits are concerned in carrying out the provisions of this invention they may, for special uses, be energized if needed by battery currents introduced, though variations in the magnetism of the system may provide the currents desired without such battery energizing if permanent magnets are used.

The flexibility or interchangeability of the various functions of my invention will be apparent. For example, it is possible to use the various devices with or without radio amplification, as desired. That is, if after using the musical instrument in connection with the radio amplifier, it is desired to use the radio apparatus as an ordinary radio device, the musical instrument is disconnected therefrom and the radio used in the ordinary manner. Or if it is desired to play a phonograph record amplified in accordance with the manner of my invention, that can be done by connecting the reproducing electromagnet of the phonograph with the radio amplifier, as shown in Fig. 12. Again, it may be desired to reproduce speech, song, or music of friends or family.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means. For example, it is proper to add that although for simplicity of description a single shaft with disks representing the succession of notes in a keyboard is mentioned, it will be found more practicable to run two or three shafts at definite but different relative speeds with certain disks on each carrying certain notes of the scale, according to the exigencies of reproduction of proper intervals of the notes of the scale with small diameter disks.

Having thus described my invention, what I claim as new and desire to secure by Letters-Patent is:—

1. The method of recording or originating sound, consisting in impressing an electrically conducting surface with a plurality of incisions of varying depth and contour to correspond accurately to its fundamental and principal harmonics, then revolving the incised surface at a speed to induce electric waves corresponding in pitch to the sound to effect faithful reproduction in electric currents of the wave-form of the sound, and recording said waves by magnetic induction on a companion surface of hard steel driven coordinately with it, whereby a true impression of the originated sound may be permanently preserved.

2. The method of recording or originating sound with fidelity, consisting in removing metal from a magnetically permeable disc at a plurality of points adjacent to its periphery, the amount of metal removed varying in amount corresponding to the combined ordinates of both fundamental and the principal harmonics of the sound, then rotating the disc at a speed corresponding to the pitch of the sound, and recording said waves by magnetic induction on a disc of hard steel driven at a coordinate speed, whereby a true replica of the sound is permanently preserved.

3. Means for originating and reproducing faithfully sound records, comprising a metal transmitting disc having metal removed near its periphery in amount to correspond to the true wave-form of the sound, both as to the strength of its fundamental and its principal harmonics, a companion hard steel reproducing disc mounted on the same revoluble shaft, and a microphone and generator in an electromagnetic circuit inductively related to both discs in their revolution.

4. The method of originating and recording sound records with fidelity, consisting in revolving a conducting disc in a magnetic field fluctuating in magnetic strength in strict accordance with the wave form of the sound for a definite period of time, relaying by amplification the electromagnetic waves generated and recording them on a companion disc revolving at a proportional speed in a permanent form for subsequent use in reproducing the sound.

5. The method of originating and recording sound with fidelity consisting in revolving in a magnetic field a conducting disc, varying the strength of the field in strict accordance with the wave-form of the sound, electrically amplifying its fundamental and principal harmonics, and impressing on a recording disc in permanent form the wave-form of the pure amplified sound.

6. The method of originating and recording sound with fidelity consisting in revolving in a magnetic field an iron transmitting disc, varying the strength of the field in strict accordance with the wave-form of the sound, electrically amplifying its fundamental and principal harmonics, and impressing on an iron recording disc in permanent form the wave-form of the pure amplified sound.

7. The method of originating sound and reproducing it with fidelity consisting in forming an electrically conducting disc deficient in volume of metal in lines at a plurality of points adjacent to its periphery by an amount varying in accordance with the combined wave-form due to its fundamental and principal harmonics, revolving the disc in a magnetic field and transmitting the induced currents to a companion disc revolving at a proportionate speed and recording the waves in stable form on that disc.

8. In a sound originator a disc of magnetically permeable material having eccentrically related multiple projections of waveform throughout its circle, said wave form corresponding in true outline to the fundamental tone and principal harmonics of a given sound, and a companion originator disc of hard steel mounted to revolve coordinately with it, whereby a permanent record of the sound may be faithfully reproduced.

9. In a device for originating sound, a revoluble recording disc, a companion revolving sector driven at fractional speed accompanying the revolution of said disc while the latter is being impressed the said sector being closely associated in its movements with those of the recording disc, a contacting surface on said sector, a stationary brush trailing the sector, an electromagnetic relay, an electromagnetic impressing or reproducing system, and a suitable circuit connecting the brush, the relay and the impressing or reproducing system whereby the relay is governed by the closure of the circuit at the brush.

ELIHU THOMSON.